Nov. 7, 1950 J. F. BUTLER 2,529,210
CUTTING APPARATUS FOR WALLBOARDS AND THE LIKE
Filed May 23, 1947 2 Sheets-Sheet 1
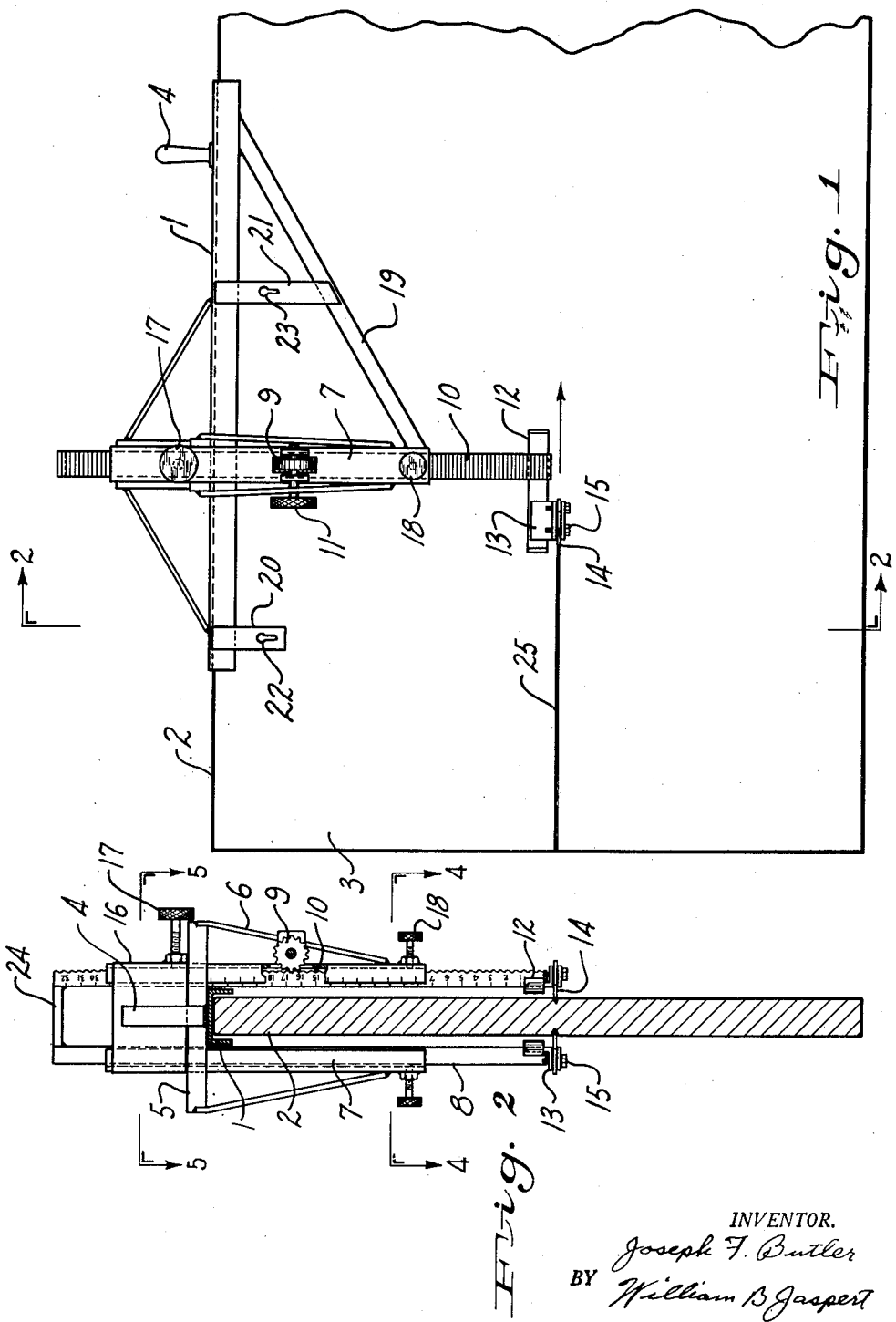
INVENTOR.
Joseph F. Butler
BY William B Jaspert
Attorney.

Nov. 7, 1950 J. F. BUTLER 2,529,210
CUTTING APPARATUS FOR WALLBOARDS AND THE LIKE
Filed May 23, 1947 2 Sheets-Sheet 2
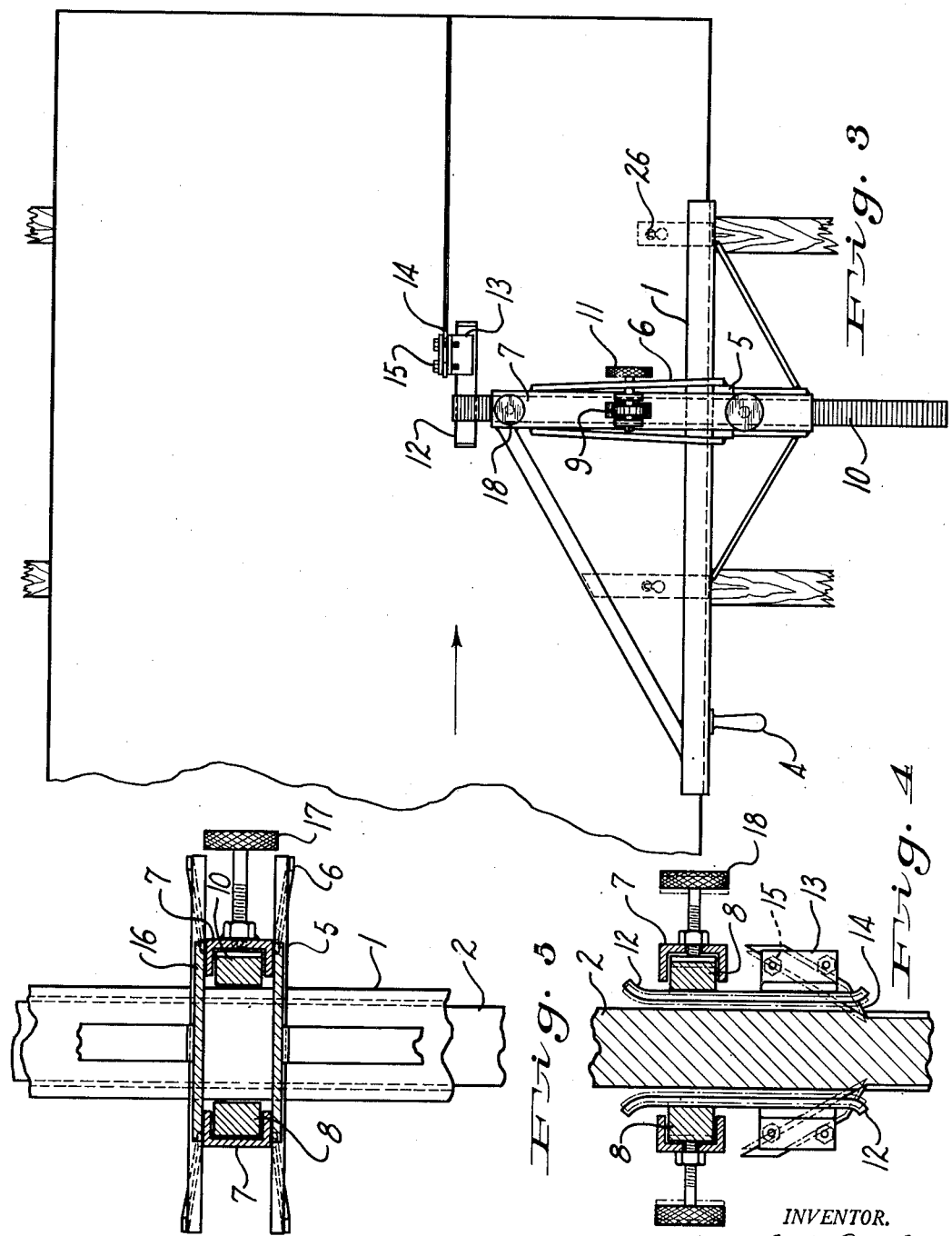
INVENTOR.
Joseph F. Butler
BY William B. Jaspert
Attorney.

Patented Nov. 7, 1950

2,529,210

UNITED STATES PATENT OFFICE 2,529,210

CUTTING APPARATUS FOR WALLBOARDS AND THE LIKE

Joseph F. Butler, Pittsburgh, Pa.

Application May 23, 1947, Serial No. 749,933

4 Claims. (Cl. 164—36)

This invention relates to improvements in apparatus for cutting and scoring building wall boards, such as plaster board or compressed fibrous materials, and the present invention is a continuation-in-part of an application Serial No. 666,715, filed May 2, 1946.

Building boards vary in thickness and size and when made of plaster are quite heavy and difficult to handle. In the above mentioned application I have disclosed cutting apparatus adapted to be drawn across such a building board to cut or score the board from opposite sides along a line on which it can be broken. In accordance with the present invention such cutting apparatus is mounted on a frame having a channel guide by which it rests on the wall board to be cut, the cutter being adjustable by an extension frame to cut off a given width of board from the whole board, so that when adjusted the cutting device may be drawn over the edge of the board the full length of the board to cut off the piece.

It is a further object of the invention to provide such apparatus which may also be suspended from a support for cutting off pieces by resting them on the channel guide and drawing them across the cutting edges.

The invention will become more apparent from a consideration of the accompanying drawings, constituting a part hereof, in which like reference numerals designate like parts, and in which Fig. 1 is a front elevational view of a building board and cutting apparatus embodying the principles of this invention;

Fig. 2 a vertical cross sectional view taken along the line 2—2, Fig. 1;

Fig. 3 a front elevational view of the cutting apparatus suspended from a building support showing its use when the wall board is moved over the guide channel;

Fig. 4 a cross sectional view of the apparatus and wall board taken along the line 4—4, Fig. 2; and Fig. 5 a cross sectional view taken along the line 5—5, Fig. 2.

With reference to Fig. 1 of the drawing, the numeral 1 designates a channel which, as shown in Fig. 2, is adapted to rest upon the edge 2 of a wall board 3. The channel guide is provided with a hand grip 4 by which it can be drawn across the top edge of the board 3. Mounted on the channel guide 1 is a cross member or yoke 5 having braces 6 that contact channel members 7 which constitute guides and supports for a pair of cutter bars 8. The cutter bars are adjustable relative to the guide channel 2 by means of a gear and rack 9 and 10, respectively, the gear 9 being rotatable by a knurled wheel 11 shown in Fig. 1. At the bottom of the cutter bars 8 a pair of straps 12 are securely mounted as by welding, the bars having knife brackets 13 secured thereto for mounting cutting blades 14, the blades being adjustably mounted in the bracket 13 by screws or bolts 15.

The cross yoke 5 is connected with an apron 16 to which the cutter arm guides 7 are attached, the apron being provided with a set screw 17 for locking the cutter bars in their adjusted position.

The cutter bar guides 7 are provided with screws 18 which also secure the cutter bars and further function to adjust the depth of the cutting blades 14 in their cutting action. The cutter bar guides 7 are secured by a brace 19 to the guide channel 1 as shown in Fig. 1, and the guide channel is provided with straps 20 and 21 having slotted perforations 22 and 23 for a purpose hereinafter described. The construction of the cross yoke 5 and the cutter straps 12 and their relation to the cutter arms and arm supports is more clearly shown in Fig. 4 of the drawing. As shown in Fig. 2, the cutter bars 8 are connected by a cross yoke 24 to rigidly secure them at one end.

The utility of the wall board cutting apparatus is shown in Figs. 1 and 3. In Fig. 1 the cutting device is entirely supported on the wall board with the guide channel 1 resting on the upper edge 2 of the board. By the use of measuring indicia on the cutter arm 8 and the cutter arm guide 7, as shown in Fig. 2, the workman adjusts the cutting blades 14 by loosening screws 17 and 18 and operating the gear wheel 9. When the adjustment has been made the set screw 17 is turned to fasten the cutter arms against movement and the set screws 18 are adjusted to set the depth of the cutting blade 14 to the desired scoring for breaking off the board after it is cut. The cut is made by simply drawing the cutting apparatus across the top of the board, resulting in the scoring as shown by the line 25, Fig. 1, to the depth as shown in Fig. 2, and when it has been scored across it is readily broken off.

Another use of the apparatus is shown in Fig. 3 wherein the guide channel 1 is in inverted position and the entire frame is suspended by straps 20 and 21 which are slipped over nails 26 on a rafter or other convenient building structure. The operator sets the cutter 14 in the same manner as explained for the use in Fig. 1 to a desired dimension and the wall board is then pulled across the guide channel 1, the board resting in the base of the channel while it is being pushed through the cutting points to score the board along its full length. The form of mount for the apparatus shown in Fig. 3 is more convenient for cutting smaller pieces after the wall board has been reduced in size by the method of use shown in Fig. 1.

By means of the above described apparatus the cutting of building board or plaster board may be accomplished by a single person as there is no need for handling large pieces. For example, if the wall board is stacked up against a wall on edge, only one sheet is drawn away from the pile and the operator can place the cutting apparatus on the edge of the sheet in the manner shown in Fig. 1. He then only handles the cut off pieces which are relatively light, and when the board gets reduced in size to where it is inconvenient to draw the cutting apparatus over the top edge for scoring, it can be inverted as shown in Fig. 3 and the board drawn across the channel guide while being supported thereon. By means of the graduated cutter arms no preliminary marking of the board to be cut is necessary and the cutting of wall board is greatly expedited.

Although one embodiment of the invention has been herein illustrated and described, it will be evident to those skilled in the art that various modifications may be made in the details of construction without departing from the principles herein set forth.

I claim:

1. Apparatus for cutting wall boards or the like comprising a relatively long guide channel adapted to engage the edge of the board to be cut for sliding movement thereon, cutting apparatus mounted on said channel comprising a plurality of guides, cutter arms movable in said guides having a cross yoke at one end thereof and having straps at their free ends, cutters mounted on said straps, means on said arm guides for displacing said cutter arms to adjust the depth of the cut, gear and rack means for adjusting the cutter arms relative to the channel guide, and adjustable clamping means for locking the cutter arms in adjusted position.

2. Apparatus for cutting wall boards or the like comprising a relatively long guide channel adapted to engage the edge of the board to be cut for sliding movement thereon, cutting apparatus mounted on said channel comprising a plurality of guides, cutter arms movable in said guides having a cross yoke at one end thereof and having straps at their free ends, cutters mounted on said straps, means on said arm guides for displacing said cutter arms relative to the face of the board to adjust the depth of the cut, means for sliding said arms in said arm guides to adjust the cutter arms relative to the channel guide, and adjustable means for locking the cutter arms, said cutter arm adjusting means comprising a gear wheel and rack and said arms and guide having measuring indicia for adjusting the cutter head to a desired cutting depth relative to the channel guide.

3. Apparatus for cutting wall boards or the like comprising a guide channel adapted to engage the edge of a wall board to be cut provided with hanger means for suspending the channel with the walls of the channel extending vertically upward for receiving a wall board therebetween, a housing secured to said channel for receiving a cutter bar, cutter guides at the ends of the cutter bar for engaging the face of the wall board and for mounting a cutter bracket thereon, blades secured in said cutter bracket, said cutter bar being provided with gear teeth and said housing having a gear wheel mounted thereon coacting with the teeth of the cutter bar for adjusting the cutter relative to the guide channel, said housing and cutter bar having graduations for setting the cutting head relative to the guide channel, and adjustable locking means for said cutter bar.

4. Cutting apparatus for wall boards and the like comprising a channel guide for sliding movement over the edge of the wall board to be cut, an extensible cutter arm mounted on said guide embodying means for adjusting the bar relative to the guide, a cutter head on said bar comprising a strap extending parallel to the board engaging surface of the channel guide, having flared ends for piloting the cutter head along the face of the board to be cut, a cutter head mounted on said pilot straps, and cutter blades mounted in said head.

JOSEPH F. BUTLER.

REFERENCES CITED

The following references are of record in the file of this patent:

UNITED STATES PATENTS

| Number | Name | Date |
|---|---|---|
| 137,952 | Paquette | Apr. 15, 1873 |
| 814,188 | Vom Cleff et al. | Mar. 6, 1906 |
| 1,578,477 | Smith et al. | Mar. 30, 1926 |

FOREIGN PATENTS

| Number | Country | Date |
|---|---|---|
| 515,094 | Great Britain | Nov. 27, 1939 |